(No Model.) 4 Sheets—Sheet 2.
W. MAIN.
FLOATING CURRENT MOTOR.
No. 328,593. Patented Oct. 20, 1885.
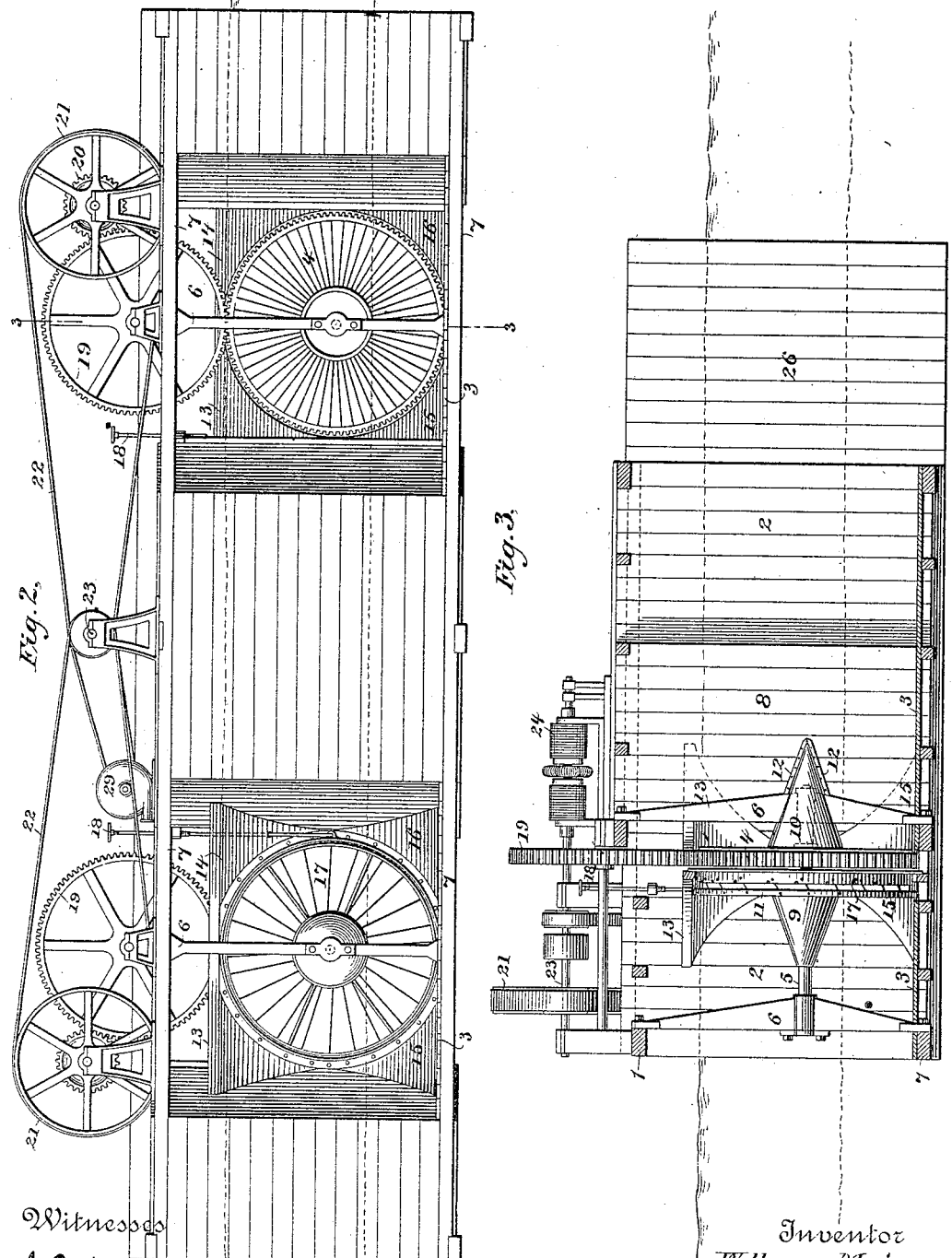
Witnesses
J. R. Nottingham
Edgar T. Gaddis
Inventor
William Main.
By his Attorney
M. H. Phelps (No Model.) 4 Sheets—Sheet 3.
W. MAIN.
FLOATING CURRENT MOTOR.
No. 328,593. Patented Oct. 20, 1885.
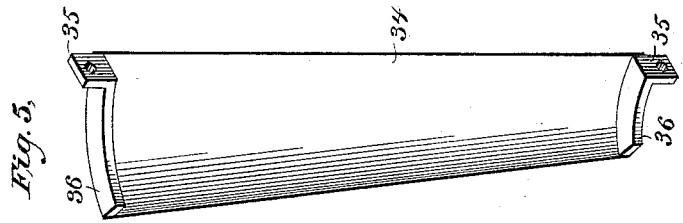
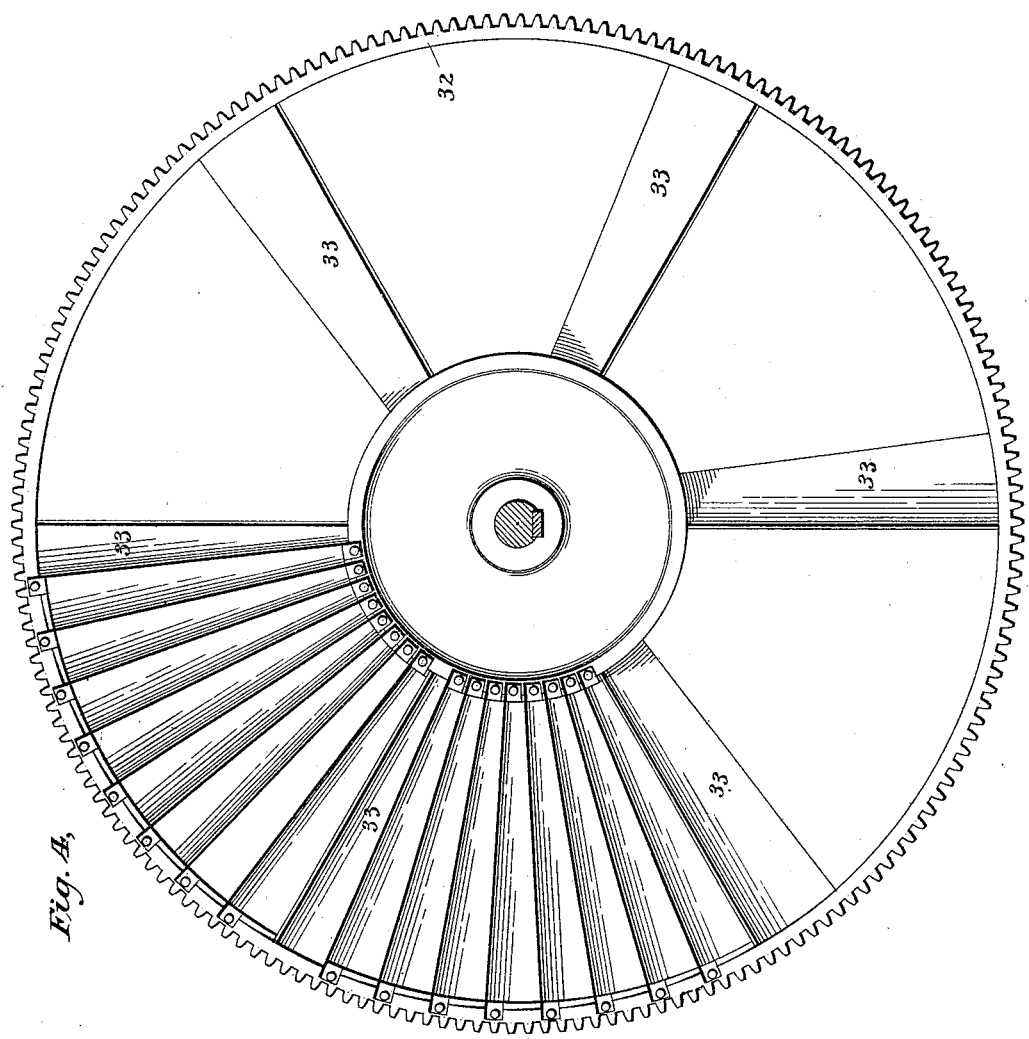
Witnesses
J. R. Nottingham
Edgar T. Gaddis
Inventor
William Main.
By his Attorney
M. H. Phelps (No Model.) 4 Sheets—Sheet 4.
W. MAIN.
FLOATING CURRENT MOTOR.
No. 328,593. Patented Oct. 20, 1885.
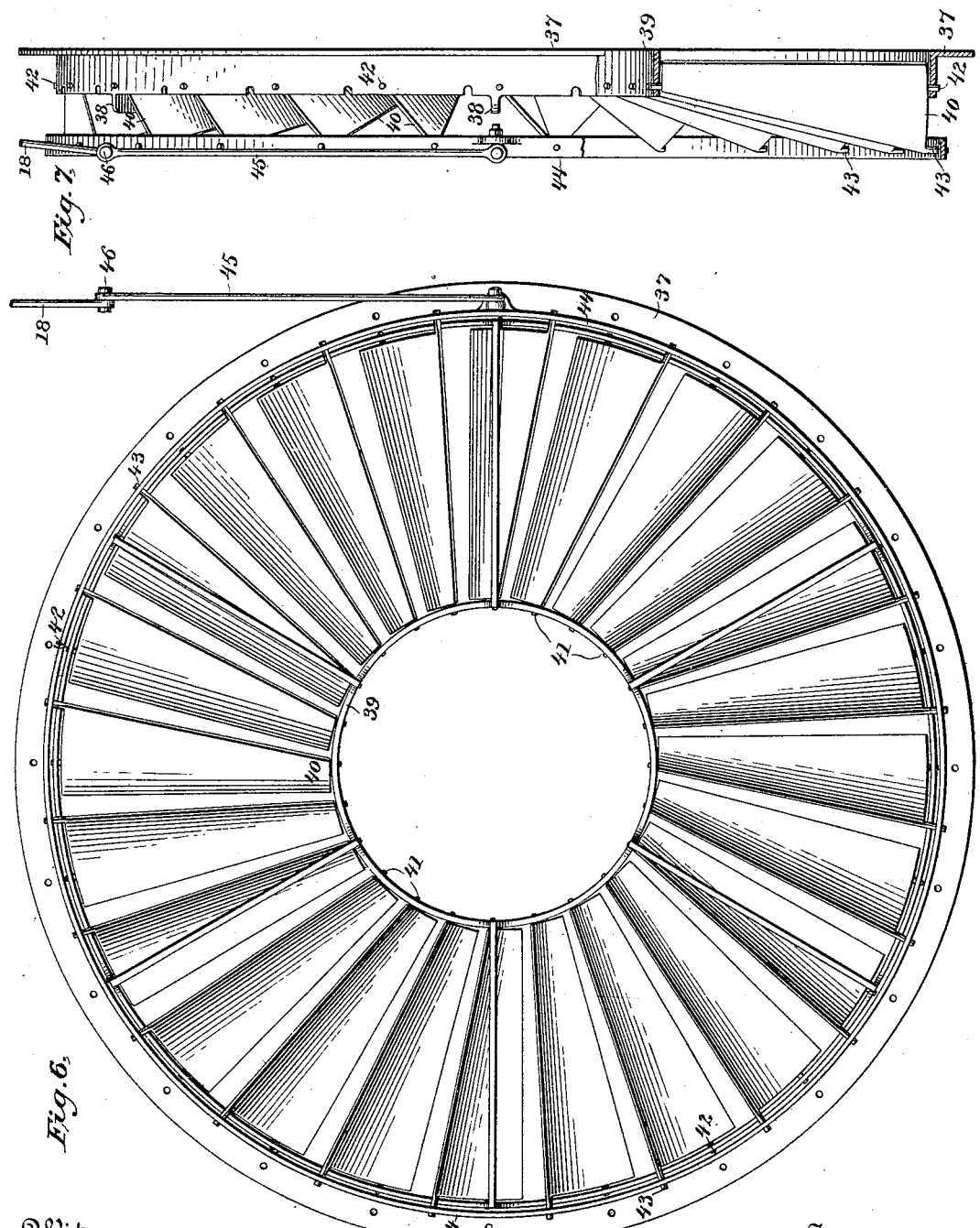
Witnesses
J. R. Nottingham
Edgar T. Gaddis
Inventor
William Main.
By his Attorney
M. H. Phelps

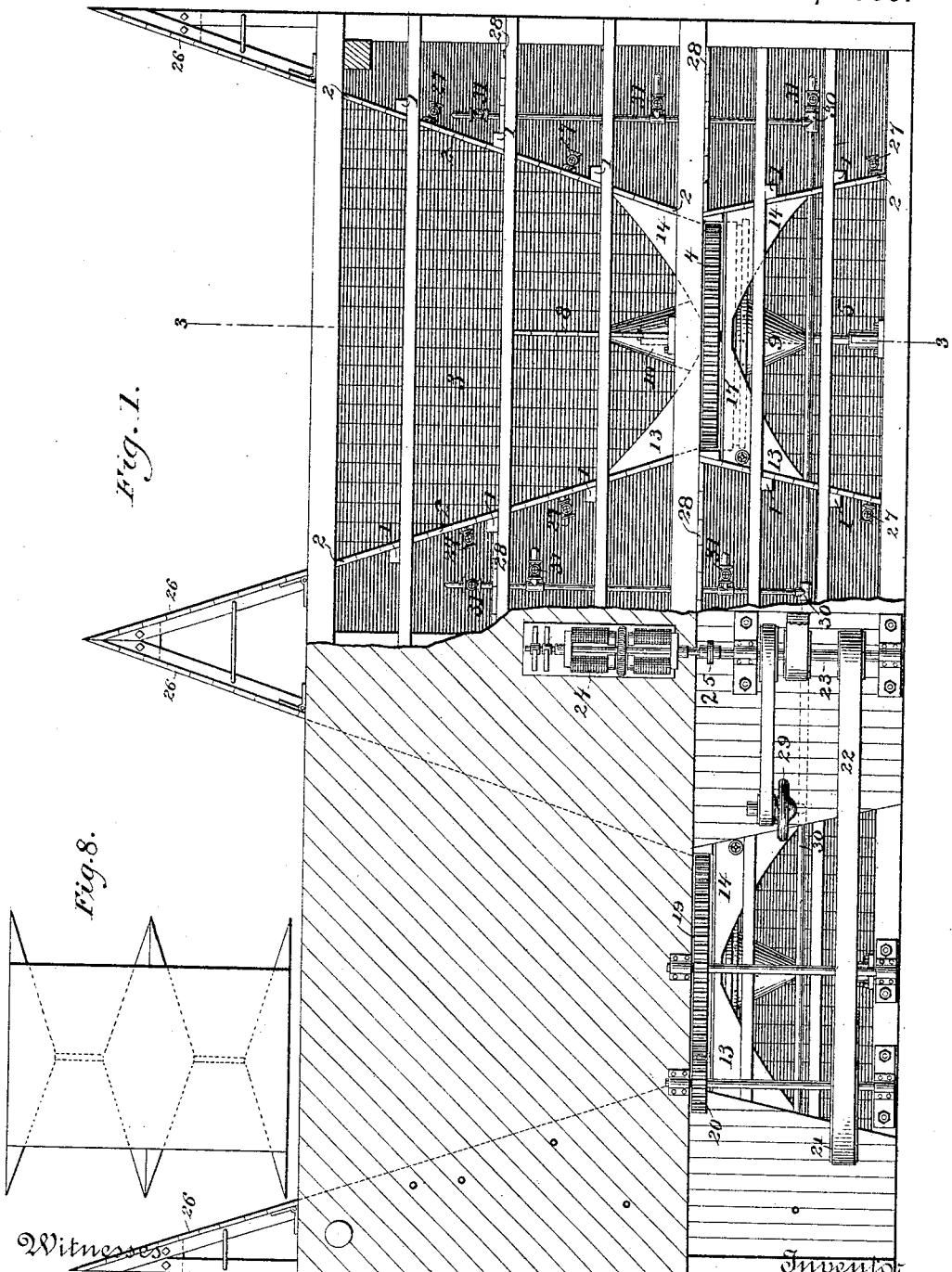

UNITED STATES PATENT OFFICE.

WILLIAM MAIN, OF BROOKLYN, NEW YORK, ASSIGNOR TO THE RIVER AND RAIL ELECTRIC LIGHT COMPANY, OF OHIO COUNTY, WEST VIRGINIA.

FLOATING CURRENT-MOTOR.

SPECIFICATION forming part of Letters Patent No. 328,593, dated October 20, 1885.

Application filed July 21, 1885. Serial No. 172,239. (No model.)

*To all whom it may concern:*

Be it known that I, WILLIAM MAIN, a citizen of the United States, residing at Brooklyn, in the county of Kings and State of New York, have invented a new and useful Improvement in Floating Current-Motors, of which the following is a specification.

An undershot wheel to intercept the force of a considerable column of water in a river, must be of such a size as to present a great surface to the action of wind and for the formation of ice. At any given moment but a small portion of the wheel is actually operative, the majority of the floats being in the air.

The object of my invention is to provide a wheel of moderate cost, which will utilize the force of a large column of water, and which will be effective whether totally or partially submerged, and to mount it upon a floating structure so made as to confine and accelerate the column of water acting upon the wheel.

It is a further object of my invention to provide means for regulating the depth of immersion of the apparatus in order both to adapt the position of the wheel to varying stages of river and consequent varying depths of water, and also to place the float under more perfect control, facilitating its movement for repairs or for the purpose of utilizing a more available part of the river-current.

My invention consists in certain details of construction hereinafter fully described and claimed.

In the drawings, Figure 1 is a horizontal projection or plan of a float carrying two water-wheels with corresponding water-ways for concentrating columns of water upon the wheels. Fig. 2 is a perspective view of the float from the downstream end. Fig. 3 is a section on line 3 3, Fig. 1. Fig. 4 is a representation, on an enlarged scale, of the wheel, Fig. 5 showing in detail the form of the blades or floats therefor. Fig. 6 represents the water-gate used with the wheel, Fig 7 being a side view of the same, the upper part in perspective, the lower in section. Fig. 8 shows in diagram a slightly-modified form of float, in which the converging water-ways on the two sides of the wheels are of the same length.

The float is essentially a box-frame built in such a manner as best to combine lightness with strength. It is decked over above and planked water-tight on the sides and bottom. In Fig. 1 nearly one-half of the decking is broken away, so as to expose the construction below. Lines of uprights 1 1, bolted to the longitudinal timbers above and below, afford support for planking 2 2, which forms the sides of the double-cone or pyramid-shaped water-ways extending completely through the float from front to back. Planking 3, nailed to the upper side of the bottom longitudinal timbers, prevents the water, which comes in at the open mouth of the water-way and is confined between its converging walls, from escaping downward before acting on the wheel. The wheel 4, placed at the narrowest part of each water-way, is of the screw-propeller type resembling the common American form of windmill. The shaft 5 of the wheel is parallel with the longitudinal axis of the water-way, and is supported by bearings in suitable uprights, 6 6, secured above and below to the heavy timbers 7 7. A vertical partition, 8, in each water-way of approach prevents the formation by suction of a spiral motion in the column of water as it approaches the wheel. The blades or floats are not extended to the center of the wheel, since their efficiency near the shaft would be small, and it is considered a preferable construction to divert the water from the axis of the wheel toward its circumference by means of the cones 9 10, the former being attached to the water-gate 17, hereinafter described, and the latter being constructed in two pieces and riveted or secured by means of the flanges 12 to the vertical partition 8. In order to cause the circular wheel to entirely fill the water-way, two sets of triangular bulk-heads, 13 14 15 16, are fastened to the walls of the water-way before and behind each wheel, and are so curved as to concentrate all the water entering the rectangular water-way upon the floats of the wheel. The water-gate 17 is fixed to the frame-work immediately behind the wheel, and determines the amount of water passing through the water-way according to its position, which is regulated as desired by means of the rod 18. The water-gate is shown in perspective in the left-hand water-way of Fig.

2, but is omitted from the right-hand waterway in order to show more clearly the waterwheel and its gearing. A circumferential cog-gear communicates the motion of the water-wheel to gear-wheel 19, which in turn gears with pinion 20, fixed to the shaft of band-wheel 21, from which, by means of belts 22, motion is communicated to the shaft 23 of a dynamo, 24. A flexible connecting device, 25, of any of the well-known forms, is inserted between the parts of the shaft to which the belts and the armature of the dynamo are respectively attached in order to prevent the strains on the gear-wheels and belting from interfering with the proper operation of the dynamo.

It will be observed that the water after passing the wheels enters shorter diverging water-ways. These are provided in order to permit the discharge of tail-water with less eddying reaction than would take place if the wheel were set directly at the rear of the float.

As shown at 26 26, Figs. 1 and 3, wings, doors, or wedge-shaped frames are attached to the body of the float by hinges or other convenient means. These devices are intended to divide the current sharply at the entrances of the water-ways, having the effect both of widening their mouths and preventing eddies. Doors of this sort can be securely braced open, as shown in Fig. 1, and be made to close over the entrance of the water-way while the float is being towed into position. Wedge-shaped frames covered with movable planking can be used in rapid currents, the several parts being placed in position and secured after the float is properly anchored, but before it is sunk to its full working depth.

The two water-ways shown in the drawings divide the float into three separate boat-like divisions. Each of these divisions is again divided into compartments by water-tight partitions. Each of these sub-divisions or compartments is provided with a valve, 27, for the admission of water, and also with means of pumping this water out, as required.

In Fig. 1 two partitions, 28 28, are shown in each division of the float, thus forming in each division three separate compartments. A centrifugal pump, 29, driven from the dynamo-shaft, is connected with the pipe 30, from which a branch extends to the bottom of each compartment. Valves 31 31 regulate the suction, allowing the action of the pump to be thrown upon a single compartment or distributed among all. With the compartments empty the float will draw but little water, and in this condition may be easily launched and towed over bars. When anchored in a suitable spot, water is to be admitted into each compartment in such quantity as to cause the float to settle evenly in the water and submerge the wheels. In case of leakage a single compartment may be emptied and calked from within. In case of collision the float would not be sunk by the entire filling of a single compartment. In low water the float may be allowed to ground itself and still at any time be floated off. It may also be found desirable, for various purposes, to tilt the float, and this can be done by proper use of these water-tight compartments. Thus it may at times be advantageous to tilt down the front end, in order to cause the bottom planking to act as a deflecting-surface, or to tilt the front end out of water in order to set out or take in the deflecting doors 26. So, too, it may be desirable to tilt one of the wheels out of the stream for repairs while the other continues to operate.

It will be observed that there is a special value in the use of means for regulating the immersion of the float when a screw-wheel is used, since wheels of this form yield results through a wide range of degrees of immersion nearly proportional to the superficial area of the blades immersed, while an undershot wheel is always adapted for use in water of a certain depth, and its power is lessened rather than increased by greater immersion.

Having thus described the construction and functions of the float, I will now explain the construction of and means for governing the water-wheel.

The wheel, Fig. 4, is made with an iron rim, 32, and iron spokes 33, which, with wheels of moderate dimensions, can all be conveniently cast in one piece with the hub. These spokes are made flattened and inclined, so as to form of themselves helical or screw-like blades. They are not to be made more numerous than is needed to secure proper strength to the rim of the wheel. The spaces between these spokes or solid arms are filled with lighter and thinner blades of sheet metal, 34, set in a helical or screw fashion, and preferably with a slight curvature, so that the angle of the float with the plane of the wheel is least at the discharge edge of the float. These sheet-metal blades, Fig. 5, are secured by lugs 35 to the rim and hub of the wheel. A variety of forms may be used for this purpose, but a preferred form is shown in Fig. 5. The lug 35 is formed at the end of a short bar, 36, which has to the plane of the lug the inclination and curvature of the float to the plane of the wheel. The ends of the sheet-metal blade are secured to the bar by rivets or otherwise, and the lugs to the rim and hub of the wheel by screws passing through them.

A screw water-wheel receives its maximum acceleration when the water passes as nearly as possible straight through it, the inclined floats being driven aside by the advancing column. The water must, however, receive to some extent by reaction a tangential element of motion in the opposite direction, which will be at a maximum when the wheel is locked fast. To increase the efficiency of the wheel I place on the discharge side a system of water-guides consisting of flat blades radiating from the axes of the wheels. When the plane of each stationary blade is perpendicular to the plane of the wheel, these blades afford a maximum reacting surface to the tangential or vertical motion of water issuing from the floats. If these blades are caused to turn on radial axes, their inclination to the plane of the wheel will be diminished, and a corresponding diminution will take place in the power of the wheel. If each blade is turned a quarter of a circle, the whole system will lie flat and will stop the flow of water either entirely or so nearly as to arrest the motion of the wheel. Figs. 6 and 7 show this system of guide-blades acting also as a water-gate. The blades are shown as closed. A large outer flanged ring, 37, secured by bolts to the wheel-casing, is united by flat spider-arms 38 to a central ring, 39. These rings hold in position the guide-blades 40, rotating on the pivots 41 at their inner ends, and the pivots 42 at their outer ends. The studs or pivots 43, projecting from the outer corners of the guide-blades, engage the movable ring 44, which, when rotated by a pull or push on the link 45, causes a simultaneous motion of the system of guide-blades. The link 45 is pivoted at 46 to the rod 18, projecting above the deck.

A current-power float arranged as described, with screw water-wheels and opposite converging and diverging water-ways, is effective in a tideway during both the ebb and flow tides. If for these conditions flat screw-blades are used, the wheel will run equally well in either direction. To procure the greatest effect the water-ways on either side should be of equal size, as shown in Fig. 9.

While I have shown the wheel in this instance as geared to a dynamo, I do not wish to restrict myself to this use; but contemplate applying my current-motor to all the other uses to which floating current-motors are applicable.

I have shown each of the three sections of the boat as subdivided by partitions; but I may omit these partitions and control the amount of immersion of the float by admitting water to or exhausting water from the three boat-like divisions.

While I have shown the float as built with two water-ways and carrying two wheels, I do not confine myself to this construction; but may arrange my floats for any number of water-wheels, from one up. The construction shown I believe in general to be the best.

The triangular bulk-heads and double cone increase the efficiency of the wheel, but are not necessary features, as the wheel would be very effective without them.

While I have shown a tight bottom for the water-ways, this is not a necessary feature, and in moderately-swift currents the wheels would be very effective without it. It should be noted that when the bottom is omitted the screw-form of wheel has a great advantage over the undershot, since the latter would operate to deflect the water downward and scour out the bottom, causing eddies in the current, and necessitating frequent movement of the float. It should further be noted, in behalf of the screw-wheels, that the float and wheels themselves will tend to change the character of the river where they are moored, sometimes causing the water to be deflected downward and to scour out the bed, deepening the channel; under other conditions operating to check the velocity of the current and cause it to drop its sediment, building up a bar beneath the float. A wheel therefore which can be used with advantage in different depths of water will require less frequent movement than one which cannot.

I wish it understood that I claim the exclusive use of my peculiarly-constructed float to carry not only water-wheels, but any other usual form of current-motor.

Under the term "dynamo-electric machine," as used in this specification and claims, I intend to include every kind of device by means of which dynamic or mechanical energy can be converted into electrical energy.

I claim—

1. The combination, with a water-power mechanism, of a floating support therefor composed of two boat-like divisions, water-tight compartments formed by transverse partitions in said divisions, valves in said compartments, and a pump communicating with said compartments, substantially as described, and for the purposes set forth.

2. The combination of a water-power mechanism, a floating support therefor, water-tight compartments in said support, a supply and an exhaust valve in each of said compartments, and a pump communicating with the exhaust-valves, substantially as described and shown.

3. A current-power float provided with one or more converging water-ways of approach, water-tight compartments, valves, and a pump for filling and emptying the same, whereby its draft of water may be regulated, substantially as shown and described.

4. In a power-float, the combination of water-tight compartments, valves, and a pump for filling and exhausting the same, a water-power mechanism mounted upon said float, a water-way of approach therefor, and hinged deflecting-surfaces for directing the water into said water-way, substantially as shown, and for the purposes set forth.

5. The combination, in a current-power float, of hinged deflecting-surfaces, fore and aft water-tight compartments, and means for filling and exhausting the same, whereby the float may be tilted to facilitate adjustment of the deflecting-surfaces, substantially as shown and described.

6. A current-power float provided with one or more diverging water-ways of exit or discharge, water-tight compartments and valves, and a pump for filling and exhausting the same, substantially as described and shown.

7. In a current-power float, the combination of one or more converging water-ways of approach connected with diverging ways of discharge, water-power mechanism placed between the water-ways of approach and those of discharge, water-tight compartments and valves, and a pump for filling and exhausting the same, substantially as described and shown.

8. The combination, with a water-power mechanism, of a floating support provided with a water-way floored over at the bottom for said mechanism, fore and aft water-tight compartments in said support, and means for filling and exhausting said compartments, substantially as described, and for the purpose set forth.

9. The combination of a converging water-way of approach, a screw-wheel mounted therein, and a water-gate fixed behind the wheel and consisting of a system of radial water-guides with adjustable inclination arranged in proximity to the discharge openings of the wheel.

10. A float for a screw water-wheel, constructed of sheet metal fastened to end bars, said bars being provided with lugs for attachment to the hub and rim of the wheel, respectively.

11. A system of radial guide-blades, in combination with a screw-wheel, and arranged in proximity to the discharge-openings of the same, substantially as shown, and for the purpose set forth.

12. A system of radial guide-blades with adjustable inclination, in combination with a screw water-wheel, and arranged in proximity to the discharge-openings of the same, substantially as shown, and for the purpose set forth.

13. The combination, with a screw-wheel, of a water-gate consisting of an inner and an outer fixed rim, radial blades, equal in number to the buckets of the wheel, extending from the inner to the outer rim and pivotally mounted therein, and a movable ring mounted upon a second set of pivots formed upon the circumferential ends of the blades, substantially as described and shown.

14. The combination, with a screw-wheel, of a water-gate having the circumferential ring 37, the hub-ring 39, attached thereto by radial arms, the blades 40, pivoted at their ends to rings 39 and 37, respectively, and equal in number to the buckets of the wheel, the ring 44, pivoted upon the outer ends of the blades, and the rod 45, for controlling the position of ring 44 with reference to the fixed ring 37, substantially as described and shown.

In testimony whereof I subscribe my name in the presence of two witnesses.

WILLIAM MAIN.

Witnesses:
EDWARD M. IVES,
F. F. RANDOLPH.